ABSTRACT OF THE DISCLOSURE

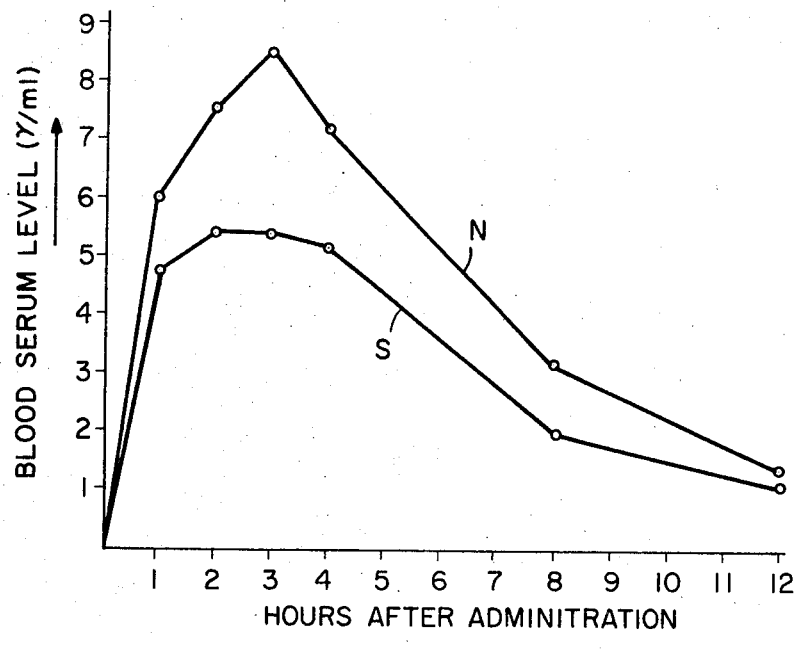
COMPARATIVE TEST RESULTS OF THE BLOOD SERUM LEVEL WITH CHLORAMPHENICOL PALMITATE SUSPENSIONS 3,708,594
PROCESS FOR MANUFACTURING A PREPARATION CONTAINING FINELY DIVIDED CHLORAMPHENICOL PALMITATE
Eiichiro Akito, Yono, Toshitsugu Takagi and Yakio Soda, Tokyo, and Masataka Ishibashi, Souka, Japan, assignors to Nippon Kayaku Co., Ltd., Tokyo, Japan
Filed Mar. 30, 1970, Ser. No. 23,946
Claims priority, application Japan, Mar. 31, 1969, 44/23,845
Int. Cl. A61k 27/00
U.S. Cl. 424—324
10 Claims

When chloramphenicol palmitate compounded with casein, gum arabic, or their mixture, and, if necessary, a preservative such as dihydro acetic acid, and a saccharide such as sugar, etc. was added to distilled water, heated to about 100° C. to melt, strongly stirred to emulsify, and cooled under stirring, a suspension of finely divided chloramphenicol palmitate particles can be obtained. Further, the suspension can be lyophilized or spray-dried to obtain powder medicines. These preparations are excellent in hydrolysis percentage by digestive enzyme (pancreatin) and blood serum level in comparison with the conventional product.

DETAIL EXPLANATION

The present invention relates to a novel process for manufacturing a preparation containing a fine crystalline chloramphenicol palmitate (hereinafter refer to CPP), which is therapeutically useful.

An antibiotic, chloramphenicol, has been known to be a medicine which is excellent in therapeutical effect but disadvantageously bitter, while its derivative, CPP, is nearly tasteless and easy to take because of being insoluble in water, and, therefore, the CPP preparation has been mainly used as an oral preparation for an infant.

However, since the CPP does not take effect in a form as it is but is therapeutically efficacious only when it is converted to an active chloramphenicol by the function of lipase in a digestive tract, the finer the particle of CPP is, the easier the CPP is subject to the function of lipase and the more excellent the therapeutical effect is. Therefore, how to make the particle of CPP fine is now the most important problem on manufacturing the preparation of the present compound.

At the present time, as the typical process for making the CPP fine, a process has been publicly known, which comprises hot dissolving the raw powder of CPP in a hydrophillic solvent such as ethanol, isopropanol, etc., and pouring the solution on an ice or on a metallic plate cooled by a freezing mixture to quench it and separating the finely divided CPP (Japanese Pat. No. 265,896), however, this process is not always economically advantageous.

As the result of having researched various processes of manufacturing fine particles of CPP, the present inventors have found that a suspension containing a fine particle of CPP of below 1μ in size can be obtained by adding CPP manufactured by means of any conventional process to a distilled water added with an appropriate amount of casein and/or gum arabic and, after heating it at approximate 100° C. to melt (M.P. of CPP is 85 to 87° C.), strongly stirring to emulsify and gradually cooling, that the suspension can be added with a liquid base containing sweetening materials and perfume to make a liquid preparation, and further that the suspension added with an appropriate amount of excipient can be lyophilized or spray-dried to prepare a dried syrup or a powder and have accomplished the present invention.

That is, the present invention relates to a process for manufacturing a preparation containing a finely divided CPP characterized by heating and melting the CPP and casein and/or gum arabic in water, if necessary, in the presence of a saccharide and/or preservative and, after stirring and suspending, cooling to make a suspension or drying the suspension to make a powder.

In carrying out the present invention, the CPP manufactured by the conventional process and an appropriate amount of casein and/or gum arabic are added to a distilled water and, if necessary, after adding a saccharide such as sugar and/or a preservative such as sodium dehydroacetate, are heated and melted at 90 to 100° C. for about 30 minutes, and, when the oily CPP is strongly stirred to suspend and cooled under stirring, a suspension containing a finely divided particle of below 1μ can be usually obtained. The suspension can be made to a liquid preparation with or without adding a liquid base containing a sweetening material and perfume. Further the suspension can be made to a dried syrup or powder by adding an appropriate amount of excepient thereto and lyophilizing or spray-drying.

The preferable casein used as a suspending agent in the present invention is sodium salt, or calcium salt, etc., and in case of using a free casein, the pH of casein containing solution is preferably adjusted to 7.0. The amount of casein used is preferably within the range of 0.3 to 4.0 parts by weight, especially 0.45 to 1.8 parts by weight, based on 1 part by weight of CPP.

The amount of gum arabic used as a suspending agent is preferable within the range of 0.5 to 6.0 parts by weight, especially 0.9 to 3.6 parts by weight based on 1 part by weight, or CPP. And in case of using a mixture of casein and gum arabic, the range of 0.15 to 2.0 parts by weight of casein and 0.23 and 3.0 parts by weight of gum arabic, especially 0.23 to 0.9 part by weight of casein and 0.45 to 1.8 parts by weight of gum arabic based on 1 part by weight of CPP is preferable.

Although the amount of suspending agent used in the present invention is usually as described above, the amount can be appropriately selected without being restricted within this range according to the preparation conditions.

The saccharide used in the present invention can include sugar, mannitol, sorbitol, etc., and the amount used is optionally selected. Not only these saccharides act as a sweetening material in the CPP containing preparation but also have a function making the suspending effect of casein and/or gum arabic more effective.

The preservative use in the present invention includes sodium dehydroacetate, methyl parabene, propyl parabene, etc., and its amount is sufficient if it is an amount conventionally used in the preparation. The addition of preservative can be conveniently carried out to complete the sterilization treatment at the same time when the CPP has completely become fine.

Next, the preparation obtained by the process of the present invention will be explained to be excellent with the hydrolysis test by digestive enzyme (pancreatin) and the test of the blood serum level and urinary excretion in comparison with the preparation prepared from α type crystalline CPP crushed to 3 to 4μ as a control.

(A) Hydrolysis test by digestive enzyme (pancreatin): 0.6 g. of digestive enzyme (pancreatin) was dissolved in 100 ml. of phosphate buffer solution of 7.0 in pH heated at 37° C. and dipped in a constant temperature bath at 37° C. for 10 minutes. Next, a certain amount (corresponding to 20 mg. of chloramphenicol) of each sample of the preparations obtained by the processes of Examples 1 and 2 in the present invention and the preparation from α type crystalline CPP crushed to 3 to 4μ as a control was added and immediately dissolved in the above digestive enzyme solution and, after 30 minutes, taken out and chloramphenicol was quantitatively analyzed by means of an automatic analyzer.

The result is as shown in Table 1.

Table 1.—Hydrolysis percentage of CPP by digestive enzyme

The product of the present invention

Hydrolysis amount:
  Control _____ 9.6
  Example 1 _____ 51.7
  Example 2 _____ 45.9

The preparation manufactured by the process of the present invention is proved to be remarkably excellent.

(B) Comparison of the blood serum level and urinary excertion: Six persons of male adult were divided into two classes, a certain amount (corresponding to 500 mg. of chloramphenicol) of each sample of the suspension obtained by the process of Example 1 in the present invention and that prepared from α-type crystalline CPP crushed to 3 to 4μ was given to them and blood serum level at each time of 1, 2, 3, 4, 8 and 12 hours and the total amount of chloramphenicol excreted in urin for 24 hours after dosage were measured and the result shown in FIG. 1 and Table 2 was obtained.

FIG. 1 shows an average value of blood serum level plotted for each hour, with the concentration (γ/ml.) as ordinate and hours after administration as abscissa, and N shows the blood serum level in the present invention and S shows that in control.

From FIG. 1 it is clear that the preparation obtained by the process of the present invention is remarkably excellent.

Table 2.—Amount (mg.) of chloroamphenicol urinary excretion

Amount of excretion:
  Control _____ 317
  Product of the present invention _____ 442

From the above table it is clear that the preparation obtained by the process of the present invention is remarkably excellent.

The secondary advantage of the process of the present invention is a fact that the suspension can be directly manufactured without separating out the finely divided particle from raw powder in comparison with the conventional process of manufacturing the suspension after separating out the finely divided particle of CPP.

The process of the present invention will be illustrated with the following examples:

EXAMPLE 1

22.5 g. of CPP, 20 g. of casein (sodium salt), 0.72 g. of methyl parabene, 0.04 g. of propyl parabene, and 120 g. of sugar were added to 200 ml. of distilled water and heated at 90 to 100° C. under stirring for 30 minutes. The dispersed molten CPP was cooled under strongly stirring and subsequently was diluted with 200 ml. of liquid base containing perfume to give a suspension comprising finely divided particles of CPP.

EXAMPLE 2

22.5 g. of CPP and 40 g. of gum arabic were added to 200 ml. of distilled water, heated under stirring, and maintained at 90 to 100° C. for 30 minutes. The dispersed molten CPP was cooled under strongly stirring and subsequently diluted with 200 ml. of liquid base containing sweetening material and perfume, etc., to give a suspension comprising finely divided particles of CPP of 1 to 2μ in size.

EXAMPLE 3

22.5 g. of CPP, 20 g. of casein (sodium salt), and 0.8 g. of sodium dehydroacetate were added to 200 ml. of distilled water, heated under stirring and maintained at 90 to 100° C. for 30 minutes.

The dispersed molten CPP was cooled under strongly stirring to give a suspension comprising finely divided particles of CPP of 1 to 2μ in size.

The suspension can be added with an appropriate amount of additive such as mannitol, cocoa powder, etc. and lyophilized and crushed to give a powder comprising CPP fine particles.

EXAMPLE 4

22.5 g. of CPP, 10 g. of casein (sodium salt), 20 g. of gum arabic, and 120 g. of sugar were added to 200 ml. of distilled water and heated to 90 to 100° C. under stirring for 30 minutes. The dispersed molten CPP was cooled under strongly stirring, and subsequently diluted with 200 ml. of liquid base containing perfume, etc. to give a suspension comprising finely divided particles of CPP.

What is claimed is:

1. A process for manufacturing a preparation containing finely divided chloramphenicol palmitate comprising adding chloramphenicol palmitate and a suspending agent chosen from the group consisting of (a) casein, (b) gum arabic and (c) a mixture of casein and gum arabic to enough water for emulsification of the chloramphenicol palmitate, heating the same to a temperature sufficiently high to melt said chloramphenicol palmitate, and stirring and dispersing them until said chloramphenicol palmitate is emulsified completely.

2. A process for manufacturing a powder medicine of chloramphenicol palmitate comprising adding chloramphenicol palmitate and a suspending agent chosen from the group consisting of (a) casein, (b) gum arabic and (c) a mixture of casein and gum arabic to enough water for emulsification of the chloramphenicol palmitate, heating the same to a temperature sufficiently high to melt said chloramphenicol palmitate, stirring and dispersing them until said chloramphenicol palmitate is emulsified completely, and, thereafter lyophilizing or spray drying them.

3. The process for manufacturing the preparation as set forth in claim 1 wherein, as the suspending agent, 0.3 to 4.0 parts by weight of casein, 0.5 to 6.0 parts by weight of gum arabic or a mixture of 0.15 to 2.0 parts by weight of casein and 0.25 to 3.0 parts by weight of gum arabic are used per 1 part by weight of chloramphenicol palmitate.

4. The process for manufacturing the powder as set forth in claim 2 wherein, as the suspending agent, 0.3 to 4.0 parts by weight of casein, 0.5 to 6.0 parts by weight of gum arabic or a mixture of 0.15 to 2.0 parts by weight of casein and 0.25 to 3.0 parts by weight of gum arabic are used per 1 part by weight of chloramphenicol palmitate.

5. The process for manufacturing the preparation as set forth in claim 1 wherein 0.9 part by weight of casein is used per 1 part by weight of chloramphenicol palmitate.

6. The process for manufacturing the powder as set forth in claim 2 wherein 0.9 part by weight is casein is used per 1 part by weight of chloramphenicol palmitate.

7. The process for manufacturing the preparation as set forth in claim 1 wherein 1.8 parts by weight of gum arabic is used per 1 part by weight of chloramphenicol palmitate.

8. The process for manufacturing the powder as set forth in claim 2 wherein 1.8 part by weight of gum arabic is used per 1 part by weight of chloramphenicol palmitate.

9. The process for manufacturing the preparation as set forth in claim 1 wherein a mixture of 0.45 part by weight of casein and 0.9 part by weight of gum arabic is used per 1 part by weight of chloramphenicol palmitate.

10. The process for manufacturing the powder as set forth in claim 2 wherein a mixture of 0.45 part by weight of casein and 0.9 part by weight of gum arabic is used per 1 part by weight of chloramphenicol palmitate.

References Cited

UNITED STATES PATENTS 3,442,926    5/1969    Houtman _____ 424—324

FOREIGN PATENTS 784,659    10/1957    Great Britain _____ 424—324

ALBERT T. MEYERS, Primary Examiner

D. M. STEPHENS, Assistant Examiner